(12) United States Patent
Lee et al.

(10) Patent No.: US 10,527,107 B2
(45) Date of Patent: Jan. 7, 2020

(54) ROTATING ELECTRICAL WEDGE TORQUE TRANSMITTING DEVICE

(71) Applicants: GM Global Technology Operations LLC, Detroit, MI (US); Shanghai Jiao Tong University, Shanghai (CN)

(72) Inventors: Chunhao J. Lee, Troy, MI (US); Jian Yao, Shanghai (CN); Li Chen, Minhang (CN); Zhao Ding, Shanghai (CN); Chengliang Yin, Minhang (CN)

(73) Assignees: GM Global Technology Operations LLC, Detroit, MI (US); Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 16/072,365

(22) PCT Filed: Mar. 9, 2016

(86) PCT No.: PCT/CN2016/075931
§ 371 (c)(1),
(2) Date: Jul. 24, 2018

(87) PCT Pub. No.: WO2017/152383
PCT Pub. Date: Sep. 14, 2017

(65) Prior Publication Data
US 2019/0024727 A1    Jan. 24, 2019

(51) Int. Cl.
*F16D 28/00* (2006.01)
*F16D 13/52* (2006.01)
*F16D 23/12* (2006.01)

(52) U.S. Cl.
CPC .............. *F16D 13/52* (2013.01); *F16D 28/00* (2013.01); *F16D 2023/123* (2013.01)

(58) Field of Classification Search
CPC ..... F16D 13/52; F16D 28/00; F16D 2023/123
See application file for complete search history.

(56) References Cited

U.S. PATENT DOCUMENTS 4,550,817 A * 11/1985 Euler ...................... F16D 13/52
                                                                                    192/70.23
5,960,916 A    10/1999   Organek et al.
(Continued)

FOREIGN PATENT DOCUMENTS

| CN | 104854362 A | 8/2015 |
|---|---|---|
| DE | 102014221545 A1 | 5/2015 |
| DE | 102014214297 A1 | 1/2016 |

OTHER PUBLICATIONS

Jian Yao, Li Chen, Cheng-Liang Yin, Jie Shu, Xin Zheng, Chunhao J. Lee, Yu Dong, Chi-Kuan Ka0, Kumar Hebbale and Farzad Samie, Modeling of a Wedge Clutch in an Automatic Transmission, SAE International paper 2010-01-0186, Published Apr. 12, 2010, 9 pages, United States.

(Continued)

*Primary Examiner* — David J Hlavka
(74) *Attorney, Agent, or Firm* — Quinn IP Law (57) ABSTRACT

A torque transmitting device (10) includes a clutch housing (14) rotatable about an axis (A), a first set of clutch plates (20A) splined to the clutch housing (14), and a second set of clutch plates (20B) interleaved with the first set and rotatable about the axis (A) of rotation. A push plate assembly (28) is splined to the clutch housing (14) for rotation therewith. A roller assembly (42) includes a roller housing (48) splined to the clutch housing (14), a roller supporter (54) housed in the roller housing (48), and a roller element (62) supported by the roller supporter (54). A wedge assembly (12) includes a wedge housing (64) connected to a wedge block (24). The wedge housing (64) includes a ramp member (70) defining a ramp surface (16) with the roller element (62) contacting the ramp surface (16). A motion converter (71) is disposed between the push plate assembly (28) and the wedge housing (64) such that axial movement of the push plate assem- (Continued)

bly (28) causes rotation of the wedge assembly (12) relative to the roller assembly (42).

20 Claims, 7 Drawing Sheets

(56) References Cited

U.S. PATENT DOCUMENTS

| | | | |
|---|---|---|---|
| 8,231,492 | B2 | 7/2012 | Chen et al. |
| 2013/0196811 | A1 | 8/2013 | Chen et al. |
| 2014/0353107 | A1 | 12/2014 | Hemphill |
| 2016/0290426 | A1* | 10/2016 | Helmer ................ F16D 23/12 |
| 2017/0297423 | A1* | 10/2017 | Finkenzeller ........... B60K 6/48 |
| 2018/0080508 | A1* | 3/2018 | Nahrwold ............ F16D 27/115 |
| 2018/0087583 | A1* | 3/2018 | Trinkenschuh ........ F16D 41/04 |
| 2018/0372168 | A1* | 12/2018 | Beigang ................ F16D 11/14 |

OTHER PUBLICATIONS

Jian Yao, Li Chen, Ding Zhao Jr., Chunhao Lee, Ying Huang, and Yin Chengliang, Self-Tuning PID Design for Slip Control of Wedge Clutches, SAE International paper 2017-01-1112, Published Mar. 28, 2017, 7 pages, United States.

Zhao Ding, Li Chen, Chengliang Yin, Jian Yao, Chunhao Lee, and Farzad Samie, A New Rotating Wedge Clutch Actuation System, SAE International paper 2017-01-2441, Published Oct. 8, 2017, 6 pages, United States.

International Search Report and Written Opinion issued in International Application No. PCT/CN2016/075931 dated Mar. 9, 2016.

* cited by examiner

ROTATING ELECTRICAL WEDGE TORQUE TRANSMITTING DEVICE

TECHNICAL FIELD

The present teachings generally relate to a torque transmitting device engageable by electric actuation, and a transmission having such a torque transmitting device.

BACKGROUND

Some automatic transmissions include an input member, an output member, a stationary member, and intermeshing gears such as planetary gearsets, or gears arranged on layshafts or countershafts. One or more selectively engageable torque transmitting devices, i.e., clutches and brakes, selectively couple various gears to other gears or to the stationary member to achieve a plurality of different speed ratios between the input member and the output member. An all-wheel drive unit of a vehicle powertrain also typically includes a selectively engageable torque-transmitting device.

In a typical automatic transmission or other portion of a powertrain, such as an all-wheel drive unit on a vehicle powertrain, the torque transmitting devices are hydraulically actuated. A hydraulic circuit that includes a pump and solenoid valves are needed to control the application of fluid pressure to each of the torque transmitting devices.

SUMMARY

A torque transmitting device is provided that enables actuation of a rotating clutch by an electric motor utilizing the mechanical advantage of a wedge to multiply the actuation force provided by an electric motor. More specifically, the torque-transmitting device includes a clutch housing rotatable about an axis, a first set of clutch plates splined to the clutch housing for rotation therewith, and a second set of clutch plates interleaved with the first set and rotatable about the axis of rotation. A push plate assembly is splined to the clutch housing for rotation therewith. A roller assembly includes a roller housing splined to the clutch housing, a roller supporter housed in the roller housing, and a roller element supported by the roller supporter. A wedge assembly includes a wedge housing and a wedge block connected to the wedge housing. The wedge housing includes a ramp member defining a ramp surface with the roller element contacting the ramp surface. A motion converter, such as a ball screw, is disposed between the push plate assembly and the wedge housing such that axial movement of the push plate assembly causes rotation of the wedge assembly relative to the roller assembly. The ramp surface is configured such that, when the wedge assembly is rotated about the axis, the roller element exerts a reaction force on the ramp surface that urges the ramp member to move in a first axial direction and thereby transmit the reaction force to the clutch plates.

In another aspect of the present teachings, a transmission comprises a plurality of rotatable members including an input member, an output member, and intermeshing gear members operatively connected to the input member and the output member and configured to selectively provide a plurality of speed ratios between the input member and the output member. The torque transmitting device operatively connects a first member and a second member of the members of the transmission to rotate in unison when engaged.

The torque transmitting device may be used in a powertrain wherever a rotating type clutch (i.e., a clutch that connects two rotating components) is needed. For example, the torque transmitting device may be used within a transmission, such as a vehicle transmission, including a hybrid transmission. The torque transmitting device could be used as an input clutch in a dual clutch transmission to connect the input member for rotation with a transfer shaft. In another example, the torque transmitting device could be used in an all-wheel drive unit, such as to transfer drive power to rear wheels.

The mechanical advantage provided by the wedge assembly allows a relatively low power electrical motor to be used to actuate the clutch assembly, thus potentially providing a cost savings. When used in a vehicle powertrain, the electric motor may be selected to be compatible with and actuated by a voltage level provided by a typical low voltage power system, such as 12 volts provided by a 12 Volt system. Alternatively, the electric motor could be adapted to be compatible with a higher voltage system, such as may be used in a hybrid transmission. Electric actuation may be more precise than a hydraulic system, improving the efficiency of a transmission or all-wheel drive unit in which the torque-transmitting device is used. Additionally, a high pressure pump used in a hydraulic transmission is not required.

The above features and advantages and other features and advantages of the present teachings are readily apparent from the following detailed description of the best modes for carrying out the present teachings when taken in connection with the accompanying drawings.

DETAILED DESCRIPTION

Figure 1:
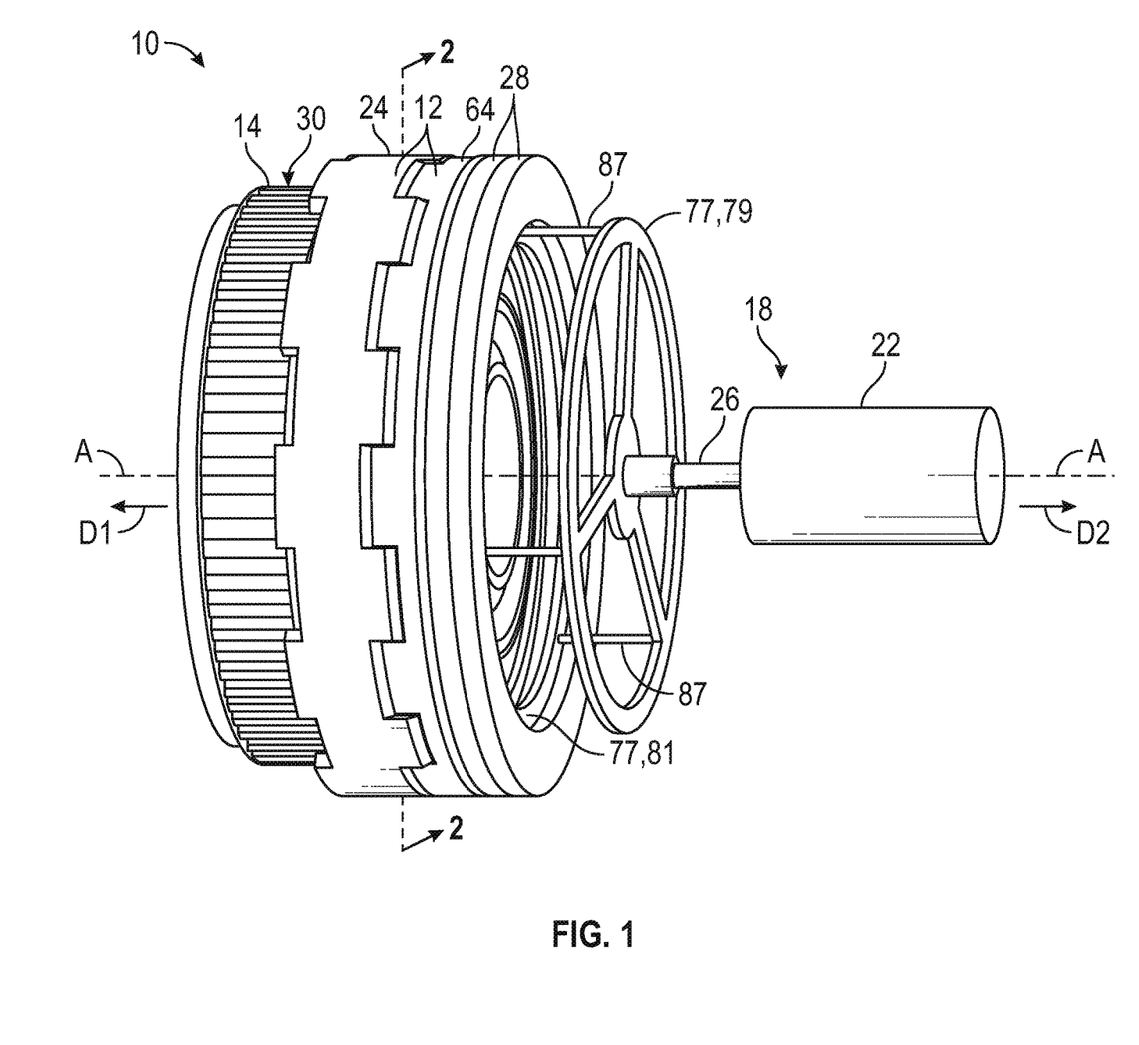
FIG. 1 is a schematic perspective illustration of a portion of a torque transmitting device.

Referring to the drawings, wherein like reference numbers refer to like components throughout the views, FIG. 1 shows a torque transmitting device 10 that is selectively engageable by electric actuation. The torque transmitting device 10 is a rotating clutch (also referred to as a rotary clutch) that is engageable to connect two rotating components to rotate at the same speed, unlike a brake that grounds a rotating component to a stationary member. As used herein, two components that are connected to rotate at the same speed are said to rotate in unison, rotate in common, be connected for common rotation, or said to rotate with one another.

Figure 2:
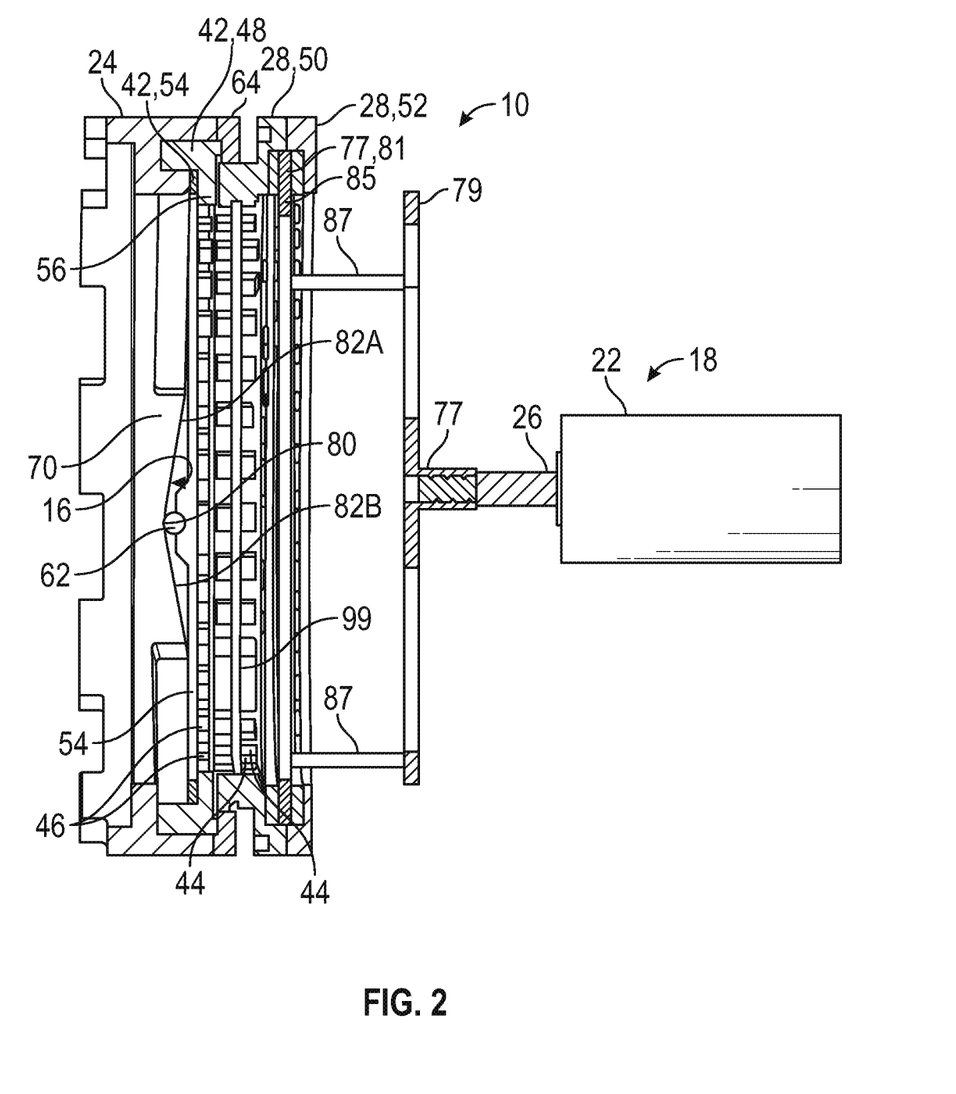
FIG. 2 is a schematic cross-sectional illustration of a portion the torque transmitting device of FIG. 1 taken at lines 2-2 in FIG. 1 and in a disengaged state, with a roller element in a first position on a ramp surface.
Figure 7:
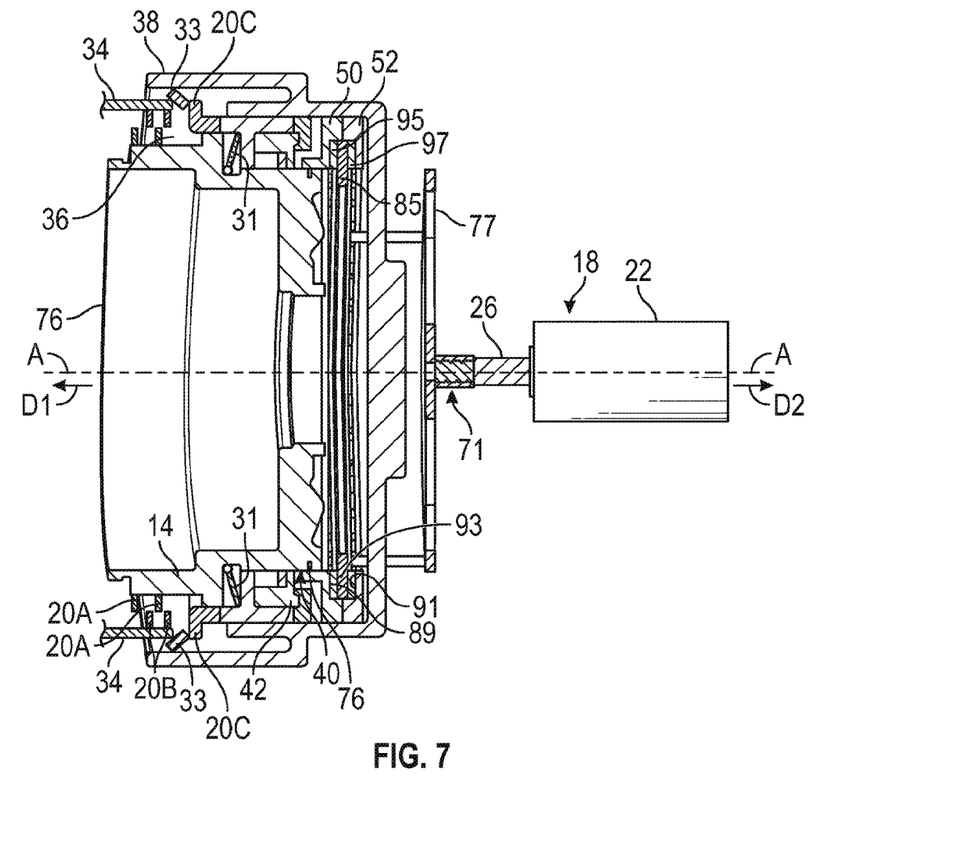
FIG. 7 is a schematic cross-sectional illustration of the torque transmitting device of FIG. 6 taken at lines 7-7 in FIG. 6.

As discussed herein and with reference to FIGS. 2 and 7, the torque transmitting device 10 is configured to cause a slight relative rotation of a wedge assembly 12 relative to a clutch housing 14 using the mechanical advantage of a wedge (i.e., a ramp member 70 with a ramp surface 16) to amplify the force of an electric actuator, such as an electric motor 18, thereby moving the wedge assembly 12 along the rotational axis (i.e., translating the wedge assembly 12) to engage sets of clutch plates 20A, 20B. The electric motor 18 has a stationary motor housing 22 but is operative to urge a wedge block 24 toward the clutch plates 20A, 20B to engage the torque transmitting device 10 via a torque-to-thrust mechanism. The motor housing 22 is not in cross-sectional view in FIGS. 2, 3, and 7, but the motor shaft 26 is in cross-sectional view. The clutch plates 20A, 20B, the apply plate 20C and the hub 34 are not shown in FIG. 5. In the embodiment shown, a rotational electric motor 18 is used with a motor shaft 26 that rotates about axis A when the motor 18 is actuated. In another embodiment, a linear motor can be used (i.e., a motor with a shaft that translates along the axis A and does not rotate, in which case no ball screw or other motion converter is required between the motor shaft and the push plate assembly 28 described herein).

Figure 5:
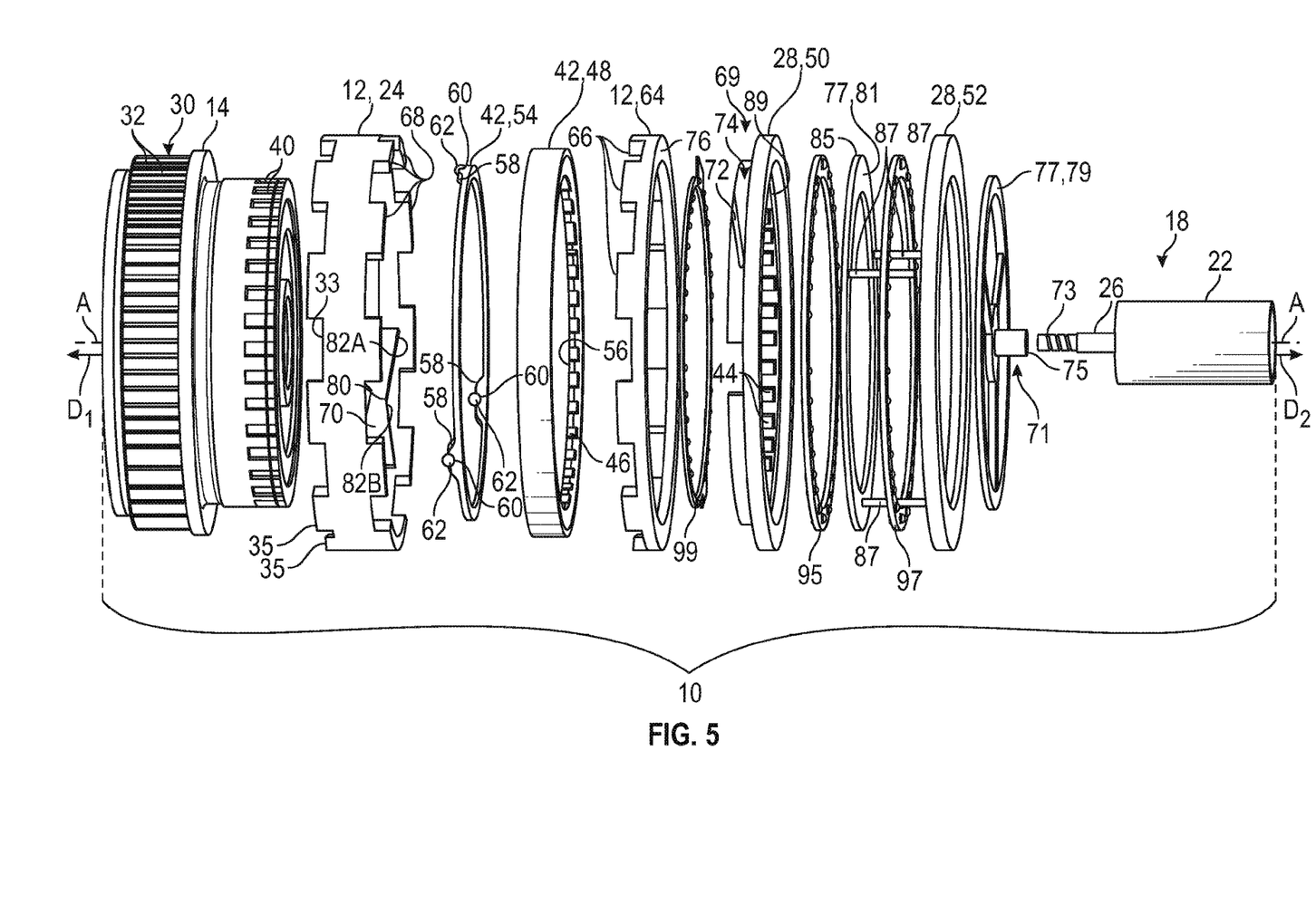
FIG. 5 is an exploded schematic perspective illustration of a portion of the torque transmitting device of FIG. 1.
Figure 6:
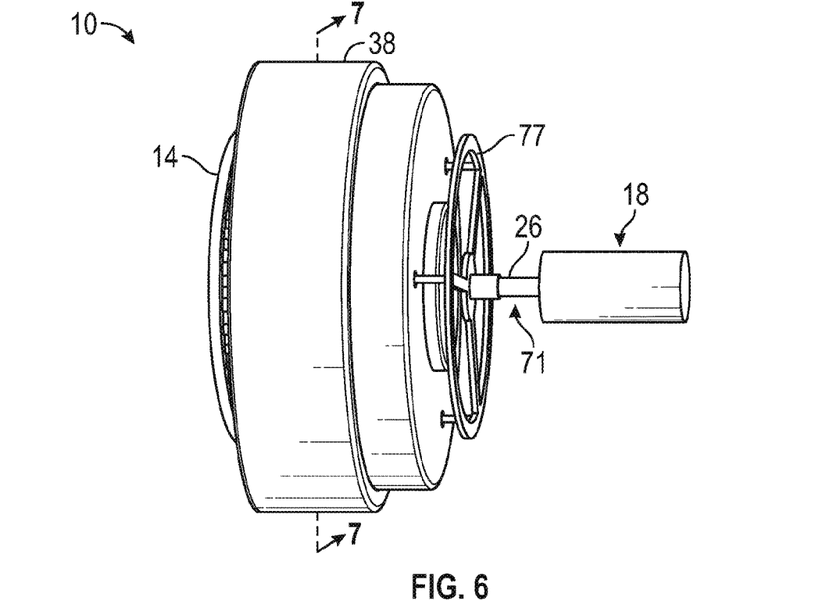
FIG. 6 is a schematic perspective illustration of the torque transmitting device of FIG. 1 with a cover.
Figure 9:
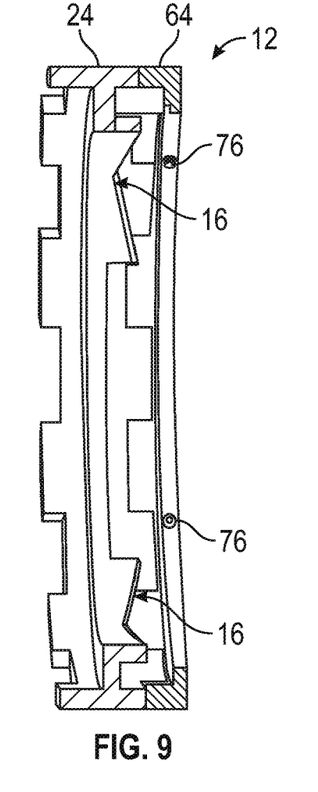
FIG. 9 is a schematic cross-sectional illustration of a wedge assembly of the torque transmitting device of FIG. 1.
Figure 10:
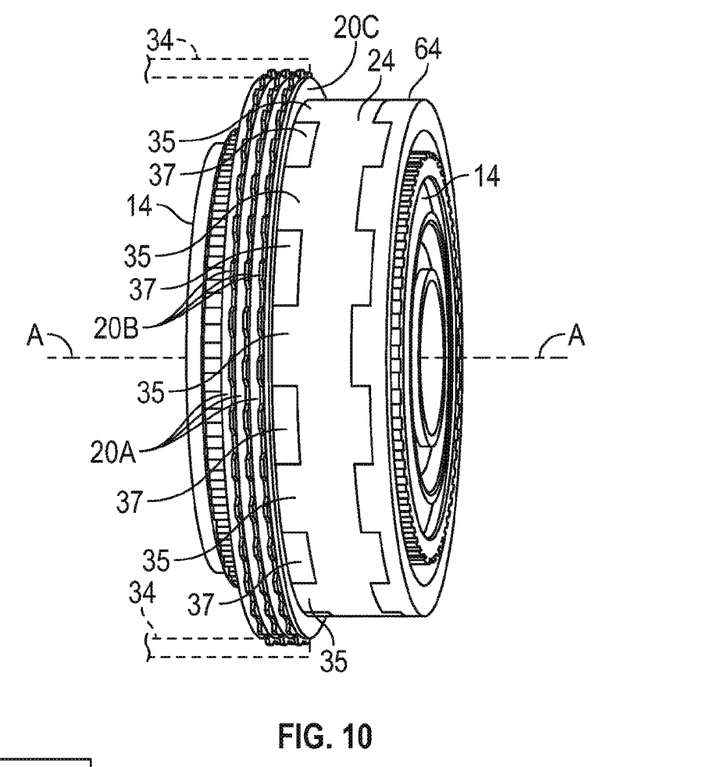
FIG. 10 is a schematic perspective illustration of the torque transmitting device of FIG. 1, showing clutch plates and an apply plate.

With reference to FIGS. 1 and 5, the torque transmitting device 10 includes a clutch housing 14 rotatable about an axis A. The axis A is a center axis. The clutch housing 14 is generally annular, and has an outer surface 30 with first outer splines 32 to which a first set of clutch plates 20A (shown in FIG. 10) is splined so that the first set of clutch plates 20A rotate in unison about the axis A with the clutch housing 14. The clutch plates 20A are represented by friction plates. A second set of annular steel clutch plates 20B is interleaved with the first set of clutch plates 20A. The clutch plates 20B are splined to an annular hub 34 that extends around the first set of clutch plates 20A and within a cavity 36 between the clutch housing 14 and a cover 38 of the torque transmitting device 10. The hub 34, the clutch plates 20A, 20B, and the apply plate 20C are shown in FIGS. 7 and 10, with the hub 34 shown in fragmentary view and in phantom in FIG. 10. The clutch plates 20B rotate about the axis A in unison with the annular hub 34, and a transmission component to which the annular hub 34 is attached, as described with respect to FIG. 9. The friction plates 20A are splined to the clutch housing 14 but are movable slightly axially along the splines. The second plates 20B are movable slightly axially along splines of the hub 34 so that the plates 20A, 20B may be axially translatable into contact with one another when the torque transmitting device 10 is engaged, as is understood by those skilled in the art. An apply plate 20C is splined to the wedge block 24 to move with the wedge block 24 both axially and rotationally. Axially-extending fingers 37 of the apply plate 20C interfit with the axially-extending fingers 35 of the wedge block 24.

Referring to FIGS. 5 and 7, an annular return spring 31 (shown in FIG. 7 biases the wedge assembly 12 in the second axial direction D2 opposite the first axial direction D1. The return spring 31 is positioned against the wedge block 24. The return spring 31 can be a coil spring, wave spring, disk spring, or any type of spring packagable between the clutch housing 14 and the wedge block 24 as shown. An optional wave plate 33 can be used to increase compliance of the apply plate 20C during actuation of the torque-transmitting device 10.

The outer surface 30 of the clutch housing 14 also has second outer splines 40 to which other components of the torque transmitting device 10 are splined to rotate in unison with the clutch housing 14 while being translatable in an axial direction along the axis A. Namely, a push plate assembly 28 and a roller assembly 42 have inner splines that are splined to the second outer splines 40 of the clutch housing 14. FIGS. 2 and 5 show inner splines 44 of a first annular push plate portion 50 of the push plate assembly 28, and inner splines 46 of a roller housing 48 of the roller assembly 42.

The push plate assembly 28 is shown in FIG. 5 with a first annular push plate portion 50 and a second annular push plate portion 52. The second annular push plate portion 52 is secured to the first annular push plate portion 50 as shown in FIG. 2 to rotate in unison therewith. For example, the second annular push plate portion 52 may be secured to the first annular push plate portion 50 with bolts, screws, or other fasteners.

The roller assembly 42 includes the annular roller housing 48 with inner splines 46 that are splined to the second outer splines 40 of the clutch housing 14. The roller assembly 42 also includes an annular roller supporter 54 housed radially inward of the roller housing 48. The roller supporter 54 abuts a surface of the radially inward-extending flange 56 of the roller housing 48 facing the clutch plates 20A, 20B. As best shown in FIG. 5, the roller supporter 54 has three equally spaced protrusions 58 that extend axially and include a center recess 60. Each of the center recesses 60 supports a roller element 62. The roller supporter 54 is configured so that the roller element 62 can spin within the recess 60 when contacting a ramp surface 16 described herein, allowing the roller element 62 to roll along the ramp surface 16 while remaining within the recess 60.

The wedge assembly 12 annularly surrounds the clutch housing 14 but is not splined to the clutch housing 14. This enables the wedge assembly 12 to rotate relative to the clutch housing 14 about the axis A. The wedge assembly 12 includes a wedge block 24 between the roller housing 48 and the clutch plates 20A, 20B, 20C, and a wedge housing 64 connected to the wedge block 24. The wedge housing 64 and the wedge block 24 are castellated and each have axially extending fingers 66, 68, respectively, that interfit with one another. Fingers 66 extend axially from wedge housing 64 and interfit with axially-extending fingers 68 of wedge block 24 so that the wedge block 24 and wedge housing 64 can move together axially along and angularly about the axis A. The wedge housing 64 is positioned axially between the wedge block 24 and the push plate assembly 28 and radially surrounds the roller housing 48.

The wedge block 24 includes a ramp member 70 defining the ramp surface 16. The roller element 62 contacts the ramp surface 16. More specifically, three identical ramp surfaces 16 are equally spaced about the wedge block 24 facing the roller supporter 54, and each is configured to extend sufficiently in a second axial direction D2 along the axis A toward the roller supporter 54 such that a different respective one of the roller elements 62 contacts each different ramp surface 16.

The configuration of the torque transmitting device 10 described herein enables the electric motor 18 with the grounded (i.e. stationary) motor housing 22 to engage the sets of friction plates 20A, 20B with one another so that the clutch housing 14 and the hub 34 rotate together in unison. The electric motor 18 may be a rotating motor, as shown, or a linear motor. In either case, the motor shaft 26 is operatively connected to the push plate assembly 28 and actuating the electric motor 18 causes the push plate assembly 28 to move in the first axial direction D1 (i.e., toward the clutch plates 20A, 20B).

In the embodiment shown, the electric motor 18 has a motor shaft 26 that rotates about the axis A when the motor 18 is electrically powered on. For example, if the torque transmitting device 10 is used in a transmission such as the transmission 202 of FIG. 9, the motor 18 is powered on by an electrical control signal from a control unit that has a processor that executes instructions to carry out a clutch engagement schedule to establish various speed ratios in correspondence with vehicle operating conditions. Because the motor shaft 26 rotates, a motion converter 71 (which in this embodiment is a ball screw 71 (referred to herein as a second ball screw)) is used to transform the rotational movement of the motor shaft 26 into axial translation along the axis A. The second ball screw 71 includes a helical groove 73 (shown only in FIG. 5) on the motor shaft 26, and an extension 75 of a connector 77 extending into the helical groove 73 and trapping a plurality of balls in the groove 73. The connector 77 moves axially along the motor shaft 26 as the motor shaft 26 rotates. The connector 77 does not rotate.

More specifically, the connector 77 includes a first connector portion 79 having the extension 75, and a second connector portion 81. The second connector portion 81 has an annular plate 85 and axially-extending legs 87 connected to annular plate 85. The legs 87 connect to the first connector portion 79 by welding, fasteners, or otherwise.

Referring to FIG. 7, the first annular push plate portion 50 has a first radial flange surface 89, and the second annular push plate portion 52 has a second radial flange surface 91. The first and second annular push plate portions 50, 52 abut one another to define a pocket 93 between the first and second radial flange surfaces 89, 91. The annular plate 85 of the second connector portion 81 is disposed in the pocket 93. A first plane bearing 95 is positioned in the pocket 93 between the first annular push plate portion 50 and the second connector portion 81, and an additional plane bearing 97 is positioned in the pocket 93 between the second connector portion 81 and the second annular push plate portion 52. The plane bearings 95, 97 reduce friction during rotation of the annular push plate 50, 52 portions relative to the non-rotating, adjacent connector portions 79, 81. Another plane bearing 99 shown in FIGS. 2 and 5 is positioned between the second annular push plate portion 52 and the wedge housing 64 to reduce friction as the wedge housing 64 rotates relative to the push plate assembly 28 during actuation of the motor 18.

Figure 8:
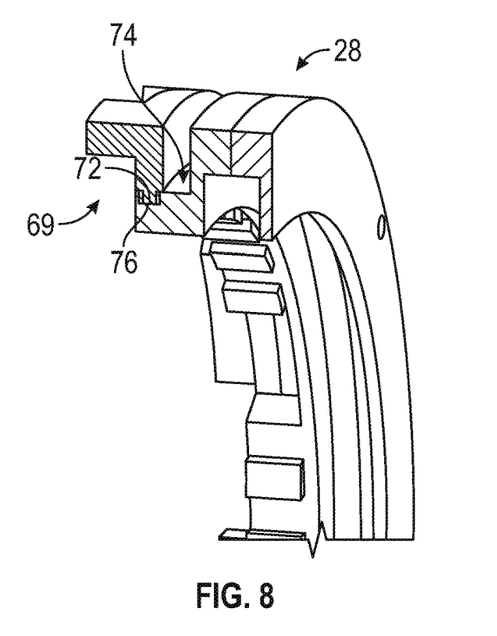
FIG. 8 is a schematic cross-sectional and fragmentary illustration of a push plate assembly and wedge assembly connected by a ball screw of the torque transmitting device of FIG. 1.

Another motion converter, which in the embodiment shown is also a ball screw 69, is disposed between the first annular push plate portion 50 of the push plate assembly 28 and the wedge housing 64 such that axial movement of the push plate assembly 28 caused by the electric motor 18 causes rotation of the wedge assembly 12 relative to the roller assembly 42. With reference to FIGS. 5 and 8, the ball screw 69 is referred to herein as a first ball screw, and includes at least one helical groove 72 on an outer annular surface 74 of the first annular push plate portion 50. Multiple helical grooves 72 can be spaced about the outer annular surface in the embodiment shown, such as three equally spaced helical grooves identical to the helical groove shown in FIG. 5. One or more balls may be disposed in each groove 72 and trapped between the first annular push plate portion 50 and the wedge housing 64 in the groove 72. The wedge housing 64 radially surrounds the outer annular surface 74 and has an extension 76 disposed in the groove 72. If three grooves 72 are in the outer surface 74, then the wedge housing 64 has three equally spaced extensions 76. One of the extensions 76 for one of the other grooves 72 is visible in FIG. 5.

The extension 76 and the helical groove 72 are configured as the ball screw 69 such that axial movement of the push plate assembly 28 causes rotation of the wedge housing 64 relative to the push plate assembly 28. When the push plate assembly 28 is moved in the first axial direction D1 toward the wedge housing 64, the extension 76 will slide in the groove 72, thus causing the wedge housing 64 to rotate relative to the push plate assembly 28 and the clutch housing 14 by an amount equal to the angular rotation of the extension 76 about the axis A as the extension 76 moves in the groove 72. Because the wedge housing 64 rotates relative to the push plate assembly 28 and the clutch housing 14, the wedge block 24 also rotates with the wedge housing 64 as it is joined to rotate in unison with the wedge housing 64 via the interlocked axially extending fingers 66, 68. In this manner, actuation of the push plate assembly 28 by a motor force of the motor 18 is amplified by the wedge effect of the ramp surface 16 and transformed into an axial force on the clutch plates 20A, 20B.

More specifically, the ramp surface 16 is configured such that, when the ramp member 70 is rotated about the axis A, the roller element 62 exerts a reaction force on the ramp surface 16 that urges the ramp member 70 to move in the first axial direction D1 (i.e., toward the clutch plates 20A, 20B) and thereby transmit the reaction force to the clutch plates 20A, 20B. The roller element 62 is rotatably mounted with respect to the clutch housing 14, and is in contact with the ramp surface 16. The ramp surface 16 is characterized by portions 80, 82A, 82B. Portion 80 of ramp surface 16 is axially disposed from portions 82A, 82B such that portion 80 is further in the first axial direction D1 along the axis A than portions 82A, 82B. In the embodiment depicted, two portions 82A, 82B extend on respective sides of portion 80. Stated differently, the ramp surface 16 includes a first portion 82A inclining in a first direction of rotation of the wedge block 24 about the axis A, and a second portion 82B inclining in a second direction of rotation of the wedge block 24 about the axis A. The mechanical advantage of a wedge is given by the ratio of the length of its slope. For example, the mechanical advantage of the roller element 62 traversing the portion 82A is the ratio of the length of the ramp portion (i.e., the distance along portion 82A from portion 80 to the width of the ramp surface 82A (i.e., the extension of the portion 82A in the second axial direction D2 from the portion 80).

When the torque transmitting device 10 is disengaged, the ramp member 70 is positioned so that the roller element 62 is in contact with portion 80 of the ramp surface 16, as shown in FIG. 2. The spring 31 of FIG. 7 biases the wedge block 24 in the second axial direction D2, and, correspondingly, biases the ramp surface 16 in the second axial direction D2 to maintain contact between the roller element 62 and the ramp surface 16.

Figure 3:
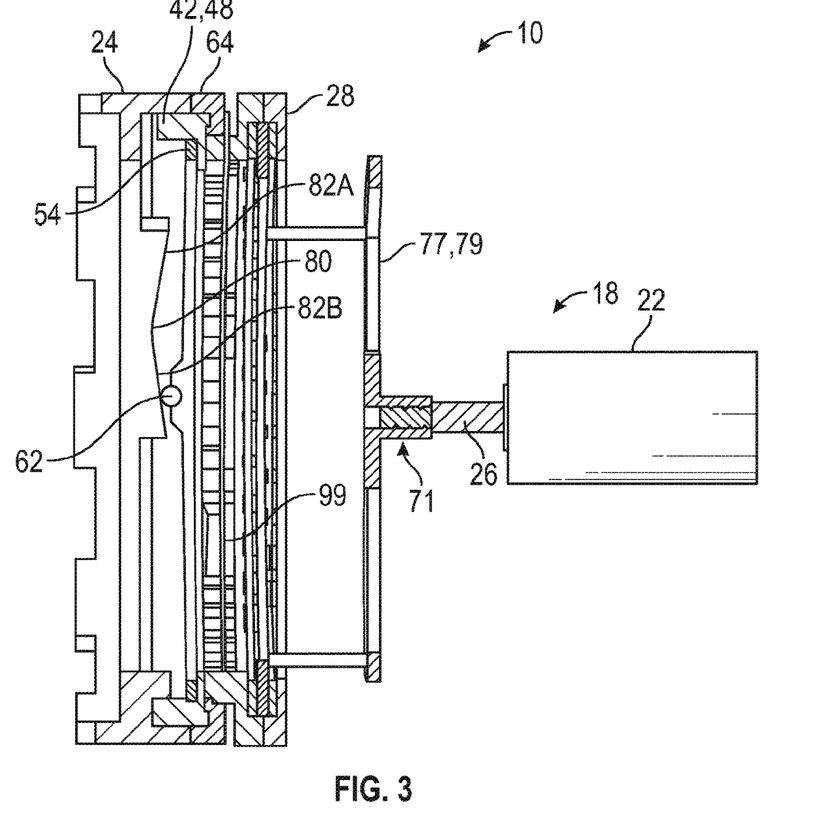
FIG. 3 is a schematic cross-sectional illustration of the torque transmitting device of FIG. 1 in an engaged state, with the roller element in a second position on the ramp surface.
Figure 4:
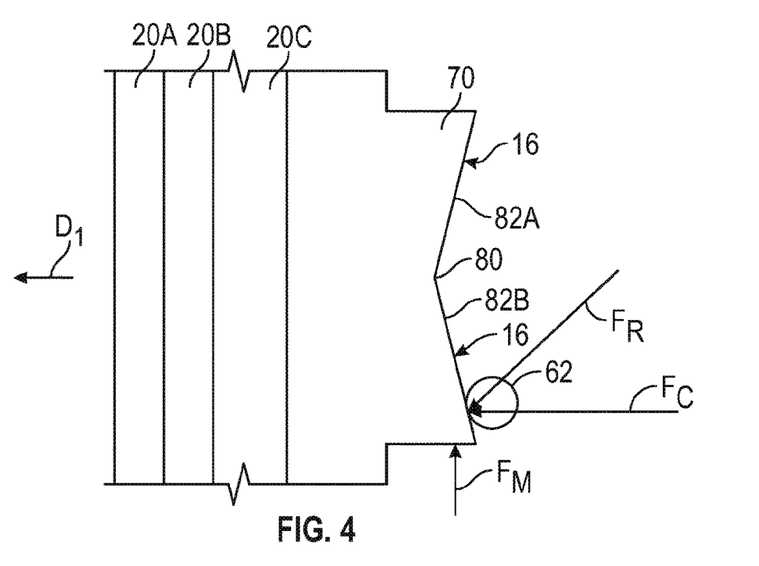
FIG. 4 is a schematic fragmentary diagram of a portion of the torque transmitting device of FIG. 1.

As schematically depicted in FIG. 4, the motor 18 exerts force $F_m$ on the ramp member 70 when the motor force is transferred through the second ball screw 71, the connector 77, the push plate assembly 28, the first ball screw 69, and the interlocked wedge housing 64 and wedge block 24. As the ramp member 70 rotates, the ramp surface 16 moves relative to the roller element 62 such that the roller element 62 traverses the ramp surface 16 from portion 80 toward portion 82A or 82B, depending on the direction of rotation of the motor 18. In FIG. 3, the roller element 62 has traversed the portion 82B. The incline of the ramp surface 16 causes the surface 16 to exert a force on the roller element 62, which in turn exerts a reaction force $F_R$ on the ramp surface 16. The reaction force $F_R$ includes a component $F_C$ in the first axial direction D1, which urges the ramp member 70 and the entire wedge block 24 in the first axial direction D1 toward the clutch plates 20A, 20B. Accordingly the ramp member 70 and the roller element 62 comprise a torque-to-thrust mechanism that converts the torque supplied by the electric motor 18 (or axial force in the case of a linear motor) to thrust, which is applied to the clutch plates 20A, 20B via the wedge block 24 and apply plate 20C.

The ramp member 70 transfers the component $F_C$ of the reaction force $F_R$ to the wedge block 24, which in turn transfers the component $F_C$ to the clutch plates 20A, 20B, thereby engaging the torque transmitting device 10. With the self-enforcement principle of a wedge mechanism, a small force $F_m$ can be enlarged to a large axial force $F_C$.

The torque transmitting device 10 can be engaged by rotating the ramp member 70 in either of two rotational directions, because the ramp surface 16 inclines toward the roller assembly 42 on two opposing sides of portion 80, as shown in FIGS. 2 and 5. For example, the torque transmitting device 10 can be used in a transmission of a powertrain of a vehicle or a stationary machine. A vehicle may be of any mobile platform, a plane, train, automotive vehicle, an all-terrain vehicle (ATV), a tractor, etc. A stationary machine may be for farm equipment, mining, drilling, etc.

The torque transmitting device 10 may be used in a powertrain wherever a rotating type clutch (i.e., a clutch that connects two rotating components) is needed. For example, the torque transmitting device 10 may be used within a transmission, such as a vehicle transmission, including a hybrid transmission. The torque transmitting device 10 could be used as an input clutch in a dual clutch transmission to connect the input member for rotation with a transfer shaft. In another example, the torque transmitting device 10 could be used in an all-wheel drive unit, such as to transfer drive power to rear wheels. For example, the housing 14 could be an input member of an all-wheel drive unit, and the hub 34 could be an output member of an all-wheel drive unit, so that when the torque transmitting device 10 is engaged, a drive shaft driving the input member is connected to drive a pair of wheels (such as rear wheels) connected to the output member that are not driven when the torque transmitting device is not engaged.

Figure 11:
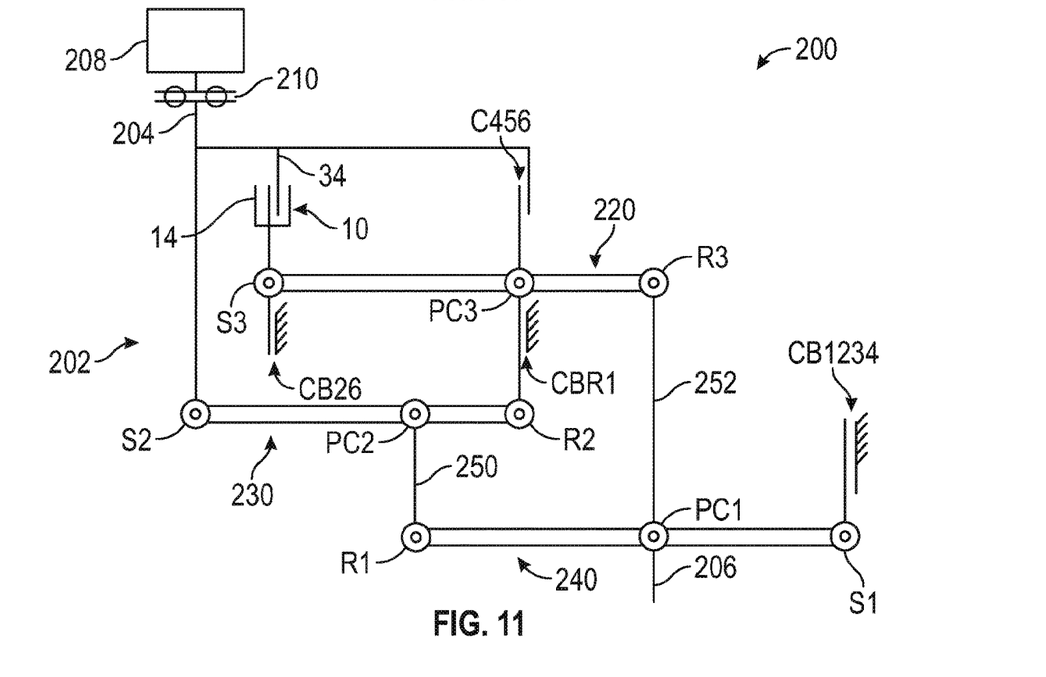
FIG. 11 is a schematic lever diagram of a multi-speed transmission that includes the torque transmitting device of FIG. 1.

In one example embodiment, FIG. 11 shows a lever diagram of a powertrain 200 including a transmission 202 that includes the torque transmitting device 10. The transmission 202 is a multi-speed transmission that includes a plurality of rotatable members, such as an input member 204, an output member 206, and intermeshing gear members operatively connected to the input member 204 and the output member 206. The input member 204 is operatively connected for rotation with an engine 208 through an isolator such as an engine damper 210. A final drive between the output member 206 and vehicle wheels is not shown.

The intermeshing gear members are members of three planetary gear sets 220, 230, 240 in the embodiment shown, and are configured to selectively provide a plurality of speed ratios between the input member 204 and the output member 206 by selectively engaging and disengaging torque transmitting devices including brakes and clutches. The first planetary gear set 220 includes a sun gear member S3, a carrier member PC3, and a ring gear member R3. The carrier member PC3 rotatably supports pinion gears that mesh with the sun gear member S3 and the ring gear member R3. The second planetary gear set 230 includes a sun gear member S2, a carrier member PC2, and a ring gear member R2. The carrier member PC2 rotatably supports pinion gears that mesh with the sun gear member S2 and the ring gear member R2. The third planetary gear set 240 includes a sun gear member S1, a carrier member PC1, and a ring gear member R1. The carrier member PC1 supports pinion gears that mesh with the sun gear member S1 and the ring gear member R1.

The input member 204 is connected for common rotation with the sun gear member S2. The output member 206 is connected for common rotation with the planet carrier member PC1. A first interconnecting member 250 continuously connects the carrier member PC2 for common rotation with the ring gear member R1. A second interconnecting member 252 continuously connects the carrier member PC1 for common rotation with the ring gear member R3.

The torque transmitting device 10 is selectively engageable to operatively connect a first member (i.e., the input member 204) and a second member (i.e., the sun gear member S3) to rotate in unison. In FIG. 10, the torque transmitting device 10 is shown only schematically, with the rotatable hub 34 of FIG. 7 and the clutch housing 14 indicated schematically. The torque transmitting device 10 is a rotatable clutch, as it connects two rotating components when engaged. The transmission 202 has six forward speed ratios and a reverse speed ratio. The torque transmitting device 10 is engaged during the third forward speed ratio, the fifth forward speed ratio, and the reverse speed ratio. The torque transmitting device 10 can be referred to as clutch C35R in the transmission 202. The rotatable hub 34 rotates with the input member 204, and the clutch housing 14 is connected to rotate in common with the sun gear member S3. The transmission 202 includes another rotatable clutch C456, and three brakes CB26, CBR1, and CB1234. In the reverse speed ratio, torque transmitting device 10 and brake CBR1 are engaged. In the first forward speed ratio, brake CBR1 and brake CB1234 are engaged. In the second forward speed ratio, brake CB26 and brake CB1234 are engaged. In the third forward speed ratio, torque transmitting device 10 and brake CB1234 are engaged. In the fourth forward speed ratio, clutch C456 and brake CB1234 are engaged. In the fifth forward speed ratio, torque transmitting device 10 and clutch C456 are engaged. In the sixth forward speed ratio, clutch C456 and brake CB26 are engaged.

As is understood by a person skilled in the art, in at least one of the reverse speed ratio, the third forward speed ratio, and the fifth forward speed ratio, the torque of the input member 204 and the hub 34 is in an opposite direction than the torque of the sun gear member S3, while in at least one of the reverse speed ratio, the third forward speed ratio, and the fifth forward speed ratios, the torque of input member 204 and hub 34 is in the same direction as the sun gear member S3. When the motor 18 is actuated, the roller element 62 traverses the first inclining portion 82A of the ramp surface 16 in the first instance, and traverses the second inclining portion 82B of the ramp surface 16 in the second instance.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A torque transmitting device comprising:
   a clutch housing rotatable about an axis;
   a first set of clutch plates splined to the clutch housing for rotation therewith;
   a second set of clutch plates interleaved with the first set and rotatable about the axis of rotation;
   a push plate assembly splined to the clutch housing for rotation therewith;
   a roller assembly including a roller housing splined to the clutch housing, a roller supporter housed in the roller housing, and a roller element supported by the roller supporter;
   a wedge assembly including a wedge housing and a wedge block connected to the wedge housing; wherein the wedge assembly is disposed between the roller assembly and the first and second sets of clutch plates;
   wherein the wedge block includes a ramp member defining a ramp surface with the roller element contacting the ramp surface; and
   a motion converter disposed between the push plate assembly and the wedge housing such that axial movement of the push plate assembly causes rotation of the wedge assembly relative to the roller assembly.

2. The torque transmitting device of claim 1, further comprising:
   an electric motor operatively connected to the push plate assembly; and
   wherein the ramp surface is configured such that, when the wedge assembly is rotated about the axis due to actuation of the electric motor, the roller element exerts a reaction force on the ramp surface that urges the ramp member to move in a first axial direction and thereby transmit the reaction force to the clutch plates.

3. The torque transmitting device of claim 2, wherein the motion converter is a first motion converter; wherein the electric motor includes a motor shaft rotatable about the axis, and further comprising:
   a second motion converter on the motor shaft;
   a connector mounted to the second motion converter and axially movable by the motor via the second motion converter; and
   a plane bearing positioned between the connector and the push plate assembly.

4. The torque transmitting device of claim 3, wherein the connector includes:
   a first connector portion mounted to the second motion converter;
   a second connector portion including an annular plate and axially-extending legs connected to the annular plate; and
   wherein the legs are connected to the first connector portion.

5. The torque transmitting device of claim 4, wherein the push plate assembly includes:
   a first annular push plate portion with a first radial flange surface;
   a second annular push plate portion with a second radial flange surface; wherein the first and second annular push plate portions abut one another to define a pocket between the first and second radial flange surfaces; and
   wherein the annular plate of the second connector portion is disposed in the pocket.

6. The torque transmitting device of claim 5, wherein the plane bearing is positioned in the pocket between the first annular push plate portion and the second connector portion; and further comprising:
   an additional plane bearing positioned in the pocket between the second connector portion and the second annular push plate portion.

7. The torque transmitting device of claim 2, wherein the electric motor is actuated by a voltage level provided by a vehicle electrical power system.

8. The torque transmitting device of claim 1, further comprising:
   a plane bearing positioned between the push plate assembly and the wedge housing.

9. The torque transmitting device of claim 1, wherein an outer annular surface of the push plate assembly defines a helical groove; and
   wherein the wedge housing radially surrounds the outer annular surface of the push plate assembly and has an extension disposed in the helical groove, with the extension and the helical groove configured as the motion converter such that axial movement of the push plate assembly causes rotation of the wedge assembly relative to the push plate assembly.

10. The torque transmitting device of claim 9, wherein the wedge housing has axially extending fingers; and
    the wedge block has axially-extending fingers interleaved with the fingers of the wedge housing to connect the wedge block to the wedge housing for common rotation about the axis with the wedge housing.

11. The torque transmitting device of claim 1, wherein the wedge housing has multiple ramp surfaces and the roller assembly includes multiple roller elements supported by the roller assembly, each of the roller elements in contact with a different respective one of the ramp surfaces.

12. The torque transmitting device of claim 11, wherein the multiple ramp surfaces and the multiple roller elements are equally spaced about the axis.

13. The torque transmitting device of claim 1, wherein the ramp surface includes in a first portion inclining in a first direction of rotation of the wedge block about the axis, and a second portion inclining in a second direction of rotation of the wedge block about the axis.

14. The torque transmitting device of claim 1, further comprising:
    a spring biasing the wedge assembly in a second axial direction opposite the first axial direction.

15. The torque transmitting device of claim 1, further comprising:
    an apply plate splined to the wedge block to move with the wedge block both axially and rotationally.

16. The torque transmitting device of claim 15, wherein the apply plate has axially-extending fingers; and
    wherein the wedge block has axially extending fingers that interfit with the axially-extending fingers of the wedge block.

17. A transmission comprising:
    a plurality of rotatable members including an input member, an output member, and intermeshing gear members operatively connected to the input member and the output member and configured to selectively provide a plurality of speed ratios between the input member and the output member;
    a selectively engageable torque transmitting device operatively connecting a first member and a second member of the members of the transmission to rotate in unison when the torque transmitting device is engaged;
wherein the torque transmitting device includes:
- a clutch housing rotatable about an axis;
- a first set of clutch plates splined to the clutch housing for rotation therewith and connected to rotate with the first member;
- a second set of clutch plates interleaved with the first set and rotatable about the axis of rotation and connected to rotate with the second member;
- a push plate assembly splined to the clutch housing for rotation therewith;
- a roller assembly including a roller housing splined to the clutch housing, a roller supporter housed in the roller housing, and a roller element supported by the roller supporter;
- a wedge assembly including a wedge housing and a wedge block connected to the wedge housing;
- wherein the wedge block includes a ramp member defining a ramp surface with the roller element contacting the ramp surface;
- a motion converter disposed between the push plate assembly and the wedge housing such that axial movement of the push plate assembly causes rotation of the wedge assembly relative to the roller assembly; and wherein the ramp surface is configured such that, when the ramp member is rotated about the axis, the roller element exerts a reaction force on the ramp surface that urges the ramp member to move in a first axial direction and thereby transmit the reaction force to the clutch plates to engage the first set of clutch plates with the second set of clutch plates.

18. The transmission of claim 17, wherein the ramp surface has a center portion, a first inclining portion, and a second inclining portion, with the center portion between the first inclining portion and the second inclining portion; and
wherein the roller element exerts a reaction force on the first inclining portion when the torque transmitting device is engaged to establish a speed ratio, and exerts a reaction force on the second inclining portion when the torque transmitting device is engaged to establish a different speed ratio.

19. The transmission of claim 17, wherein the transmission is a multi-speed transmission; and
wherein the torque transmitting device is engaged in at least one speed ratio of the multi-speed transmission.

20. The transmission of claim 17, wherein the ramp surface has a center portion, a first inclining portion, and a second inclining portion, with the center portion between the first inclining portion and the second inclining portion; and
wherein the roller element exerts a reaction force on one of the first inclining portion and the second inclining portion when the first member and the second member carry torque in the same direction of rotation, and exerts a reaction force on the other of the first inclining portion and the second inclining portion when the first member and the second member carry torque in opposite directions of rotation.

* * * * *